(12) United States Patent
Duval

(10) Patent No.: US 6,194,658 B1
(45) Date of Patent: Feb. 27, 2001

(54) ADJUSTABLE ELECTRICAL DIVIDER

(75) Inventor: Guy J. A. Duval, St-Jean-sur-Richelieu (CA)

(73) Assignee: Ipex Inc., Toronto (CA)

( * ) Notice: Subject to any disclaimer, the term of this patent is extended or adjusted under 35 U.S.C. 154(b) by 0 days.

(21) Appl. No.: 09/332,993

(22) Filed: Jun. 15, 1999

(51) Int. Cl.$^7$ .................................................. H02B 1/30
(52) U.S. Cl. ........................................... 174/64; 220/4.02
(58) Field of Search .................................. 174/64, 59, 60, 174/65 R, 50, 48, 17 R, 68.1; 220/3.2, 3.8, 4.02, 4.03, 3.94

(56) References Cited

U.S. PATENT DOCUMENTS

| | | | |
|---|---|---|---|
| 2,511,524 | * 6/1950 | Adler | 333/124 |
| 4,572,923 | 2/1986 | Castellani et al. . | |
| 4,951,923 | * 8/1990 | Couture | 254/134.3 R |
| 5,007,549 | 4/1991 | Suk . | |
| 5,160,809 | 11/1992 | Yang . | |
| 5,306,870 | * 4/1994 | Abat | 174/65 R |
| 5,466,886 | 11/1995 | Lengyel et al. . | |
| 5,627,340 | 5/1997 | Smith et al. . | |
| 5,739,467 | * 4/1998 | Fabolzi | 174/60 |
| 5,783,774 | 7/1998 | Bowman et al. . | |
| 5,831,213 | * 11/1998 | Wright et al. | 174/64 |

FOREIGN PATENT DOCUMENTS

501728  * 2/1939 (GB) ..................................... 174/64

* cited by examiner

Primary Examiner—Kristine Kincaid
Assistant Examiner—Dhiru R Patel
(74) Attorney, Agent, or Firm—Riches, McKenzie & Herbert LLP; Jeffrey Pervanas

(57) ABSTRACT

An electrical divider for installation in an electrical outlet box is disclosed. The electrical divider has a first part made up of two movable portions. The movable portions are biased away from each other. The first part is inserted into an electrical box and the two portions allowed to move relative to each other such that the first part becomes secured to the electrical box in a desired position. The first part also has at least one locking tab which engages a port of the electrical box to secure the first part in the desired position and also to position the first part into the desired position. A conduit is attachable to an opening in the first part and also an opening in a second part. In this way, a passage can be defined from one port to an opening of the electrical box. The first part can be inserted into and secured to any type of electrical box and is adjustable to accommodate electrical boxes having different dimensions and shapes. It is not necessary for the electrical box to have any guiding elements to cooperate with the electrical divider.

22 Claims, 6 Drawing Sheets

ADJUSTABLE ELECTRICAL DIVIDER

FIELD OF THE INVENTION

This invention relates to an electrical divider for use with an electrical outlet box assembly for power and communication wires. More specifically, the present invention relates to an electrical divider which can be installed into different types of electrical outlet box assemblies.

BACKGROUND OF THE INVENTION

Conventional electrical outlet boxes have been in use for several years to assist in the installation of electrical wires, and in particular, power wires. The electrical wires enter electrical boxes through ports located near the base of the electrical box. The electrical wires extend through the port, into the electrical box and to an open end of the electrical box. The electrical wires are then connected to an electrical receptacle which is located substantially flush with the floor and generally covered by a floor cover plate. As the open end of electrical boxes is generally flush with the floor, electrical boxes are sometimes referred to as floor boxes.

With an increasing proliferation of computers in the workplace, there is a need for electrical boxes to accommodate both communication services wires and power services wires. Communication services wires, such as telephone lines or computer lines, transmit communication and data signals to computers. Power services wires carry electrical power to power electrical appliances.

There is generally a substantial difference in the voltage of the communication wires and the power wires. For example, communication wires are generally low voltage in the range of 5 volts, while power wires are generally higher voltage in the range of 120 volts in North America and 240 volts in Europe.

Many electrical codes and regulations require separation of communication wires from power wires at all times, including within electrical boxes. One reason for requiring the power wires to be separated from the communication wires is to prevent accidental contact between the lower voltage communication wires and the higher voltage power wires. This makes installation of the communication and power wires safer. In addition, separating the power and communication wires ensures no accidental contact occurs between the power and communication wires over the years of use of the equipment and devices connected to the wires. Also, if the higher voltage power wires are not separated from the lower voltage communication wires, the higher voltage, generally alternating current, of the power wires may degrade the communication and data signals of the communication wires.

In the past, electrical dividers have been custom made to fit within specific electrical boxes. In these prior art devices, the electrical dividers are manufactured to specific tolerances and cooperate with the corresponding electrical boxes to provide a secure fit between the divider and the electrical boxes.

However, it is not possible to use electrical dividers manufactured for a particular type of electrical box in a different type of electrical box. This is the case at least because dividers are manufactured to specific tolerances so as to cooperate with the electrical box and to become securely fixed in a desired position, where the electrical wires can extend from the port into the divider.

In addition, a large number of existing electrical dividers were manufactured only for power service wires. Therefore, no electrical dividers were ever made for many electrical boxes which were installed in the past and are still in use today. Moreover, these existing electrical boxes were not manufactured with guiding notches or other guiding elements to assist in positioning, orienting and securing an electrical divider in the desired position. Therefore, it is not possible to retrofit a large number of existing electrical boxes presently in use as no electrical dividers were ever manufactured to cooperate with these specific electrical boxes.

Accordingly, there is a need in the art for an improved electrical divider which can be used in more than one type of electrical box. In addition, there is a need in the art for electrical dividers which can be retrofitted into existing installed electrical boxes.

SUMMARY OF THE INVENTION

Accordingly, it is an object of this invention to at least partially overcome the disadvantages of the prior art. Also, it is an object of this invention to provide an improved type of electrical divider which can be installed in different types of electrical boxes. It is also an object of the present invention to provide an electrical divider which can be retrofitted into existing installed electrical boxes.

Accordingly, in one aspect, the present invention resides in an electrical divider for installation in an electrical box, said electrical box having an open end, a first port for receiving a first type of wire and a second port for receiving a second type of wire, said electrical divider comprising: a first part comprising a first portion and a second portion, said first portion being movable with respect to the second portion, and a first opening; a second part having a second opening; wherein the first portion moves relative to the second portion to secure the first part to the electrical box; and wherein the first opening communicates with the second opening to define a passage for the first type of wire from the first port to the open end, said passage being separated from the second port.

In a further aspect, the present invention resides in an electrical divider for installation in an electrical box, said electrical box having an open end, a first port for receiving a first type of wire and a second port for receiving a second type of wire, said electrical divider comprising: a first part comprising a first opening attachable to a first end of a conduit and being expandable from a contracted configuration to an expanded configuration; a second part having a second opening attachable to a second end of the conduit; wherein the first part is inserted into the open end of the electrical box to a desired position, and, the first part is expanded from the contracted configuration toward the expanded configuration to secure the first part in the desired position; and wherein when the first part is in the desired position, and the conduit is connected to the first opening and the second opening, the first part, the conduit and the second part define a first passage for the first type of wire from the first port to the open end, said passage being separated from the second port.

Accordingly, one advantage of the present invention is that the electrical divider can be adjustable to cooperate and fit within electrical boxes having different dimensions. In this way, the electrical divider is not restricted to use with a particular type of electrical box, but can be used with a number of different types of electrical boxes, each having different dimensions.

A further advantage of the present invention is that the electrical divider does not require the electrical box to have any guiding elements to install the divider in the electrical box. In other words, the electrical divider of the present invention can be installed directly into existing electrical boxes which were never specifically designed for use in association with an electrical divider.

In a further aspect, the present invention provides at least one locking tab which engages at least one port of the electrical box. In this way, the locking tabs can both secure the first part of the electrical divider in the desired position, as well as be used to position and orient the first part of the electrical divider to the desired position and orientation with respect to the ports.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1A:
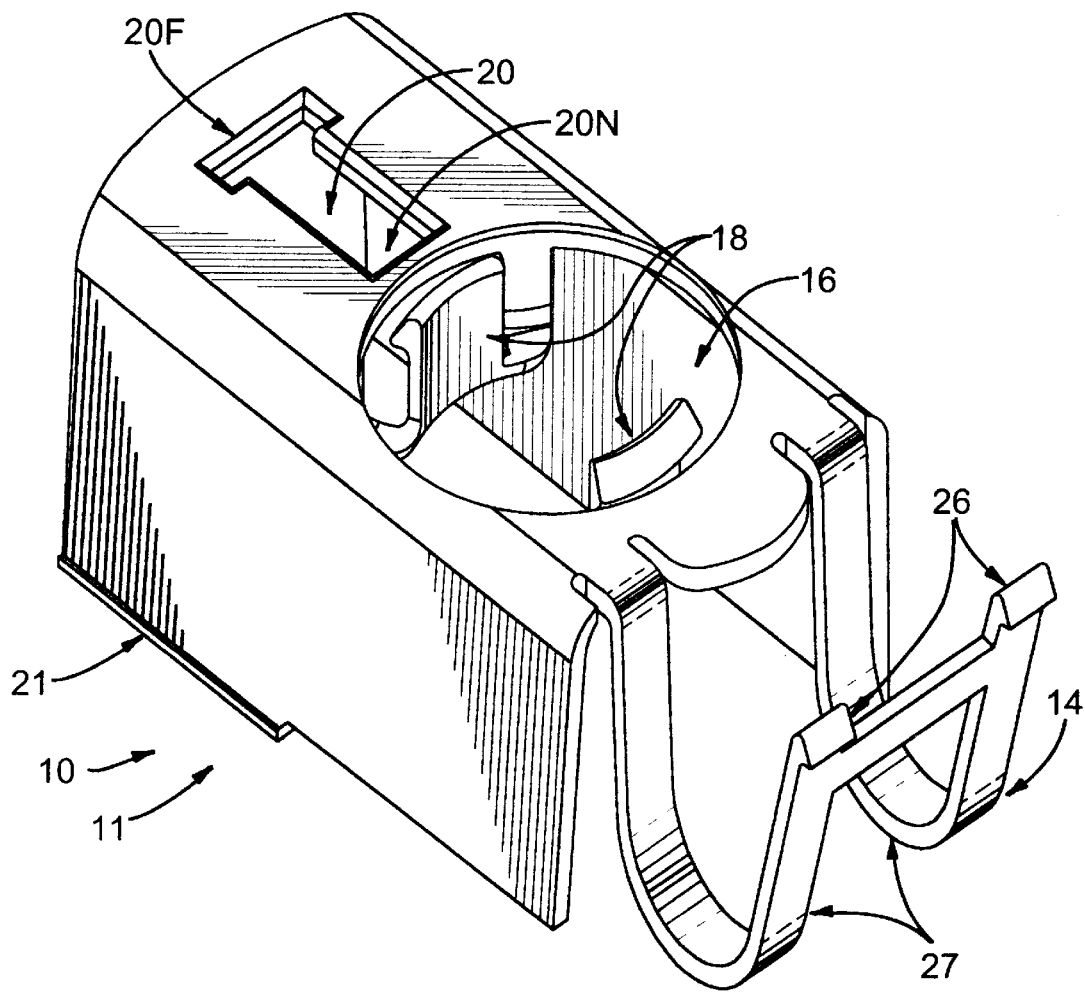
FIG. 1A is a perspective drawing of a first portion of a first part of the divider according to one embodiment of the present invention.
Figure 1B:
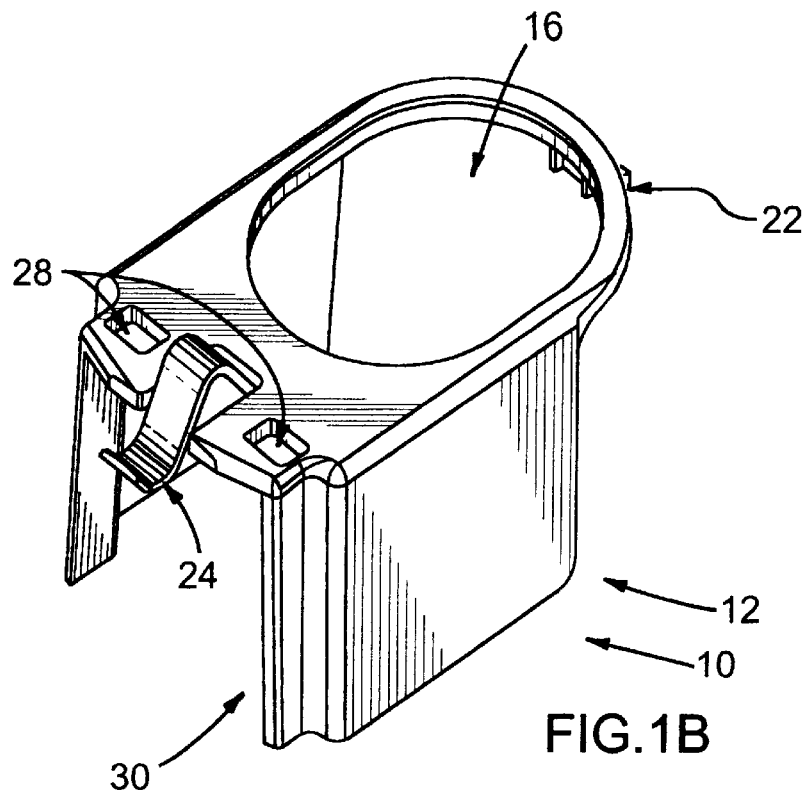
FIG. 1B is a perspective drawing of a second portion of the first part of the divider according to one embodiment of the present invention.
Figure 1C:
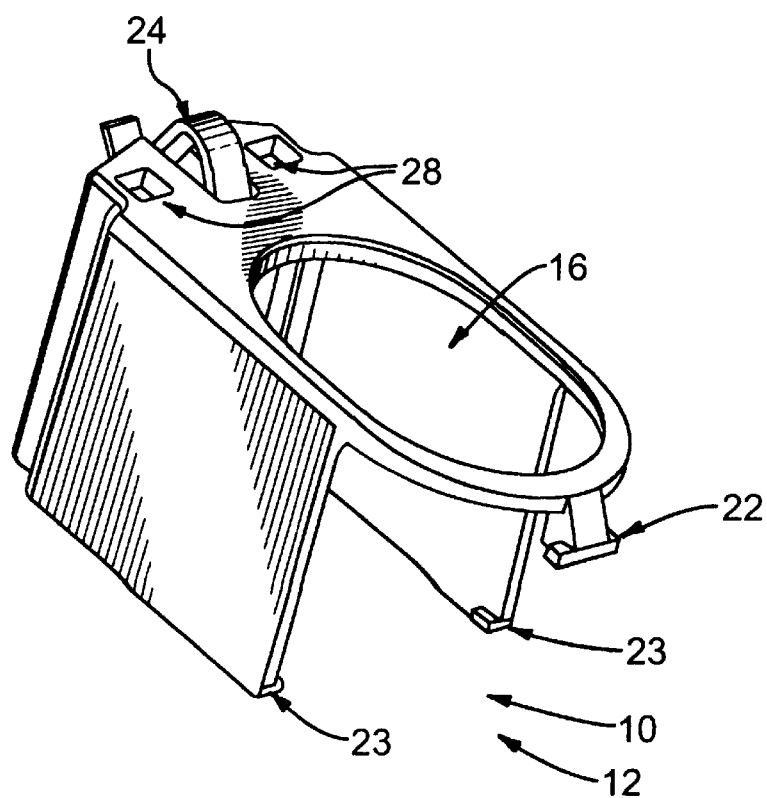
FIG. 1C is a perspective drawing of the second portion of the first part shown in FIG. 1B, but from a different view.

As shown in FIGS. 1A, 1B and 1C, one embodiment of the present invention relates to an electrical divider having a first part, as shown generally by reference numeral 10 in FIGS. 1A, 1B and 1C. The first part 10 comprises two portions, namely the first portion 11 shown in FIG. 1A and the second portion 12 shown in both FIG. 1B and 1C.

In a preferred embodiment, the first portion 11 and second portion 12 fit together to form the first part 10 in the following way. The first portion 11 comprises a channel 20 which cooperates with guide tab 22 on the second portion 12. Likewise, the first portion 11 has extensions 26 which fit into locking holes 28 on the second portion 12. In this way, the first portion 11 can move relative to the second portion 12 by the guide tab 22 travelling along one end of channel 20 while the extensions 26 remain engaged in the locking holes 28 at the other end. Thus, by the extensions 26 engaging the locking holes 28, the first portion 11 is connected to the second portion 12 at one end, but the first portion 11 is permitted to move relative to the second portion 12. The guide tab 22 travelling in the channel 20 guides the movement of the first portion 11 with respect to the second portion 12. In addition, the first portion 11 also comprises grooves 21 which cooperate with sliding tabs 23 on the second portion 12. The sliding tabs 23 travelling within the grooves 21 also guide the movement of the first portion 11 with respect to the second portion 12 and prevents rotation of the first portion 11 with respect to the second portion 12 about the extensions 26. Preferably, the grooves 21 and sliding tabs 23 are located remotely from the extensions 26 to provide a larger moment arm to assist in preventing rotation of the first part 10 and to increase the rigidity of the first part 10.

In a preferred embodiment, the first portion 11 comprises resilient u-shaped arms 27 attaching extensions 26 to the main body of the first portion 11. The u-shaped arms 27 are resilient such that when the extensions 26 are inserted in locking holes 28 and the guide tab 22 is inserted in the channel 20, the resilient u-shaped arms 27 will bias the first portion 11 away from the second portion 12. In this way, the resilient u-shaped arms 27 act as a biasing member 14 to bias the first portion 11 away from the second portion 12. Thus, the biasing member 14 biases the first part 10 from a first or contracted configuration, where the first part 10 has a smaller dimension, to a second or expanded configuration, where the first part 10 has a larger dimension. In the contracted configuration, the guide tab 22 is at a far end 20F of channel 20, and in the expanded configuration, the guide tab 22 is at a near end 20N of the channel 20. The biasing member 14 biases the first portion 11 away from the second portion 12 so that the first part 10 is biased toward the expanded configuration and will tend to expand from the contracted configuration toward the expanded configuration.

Figure 3:
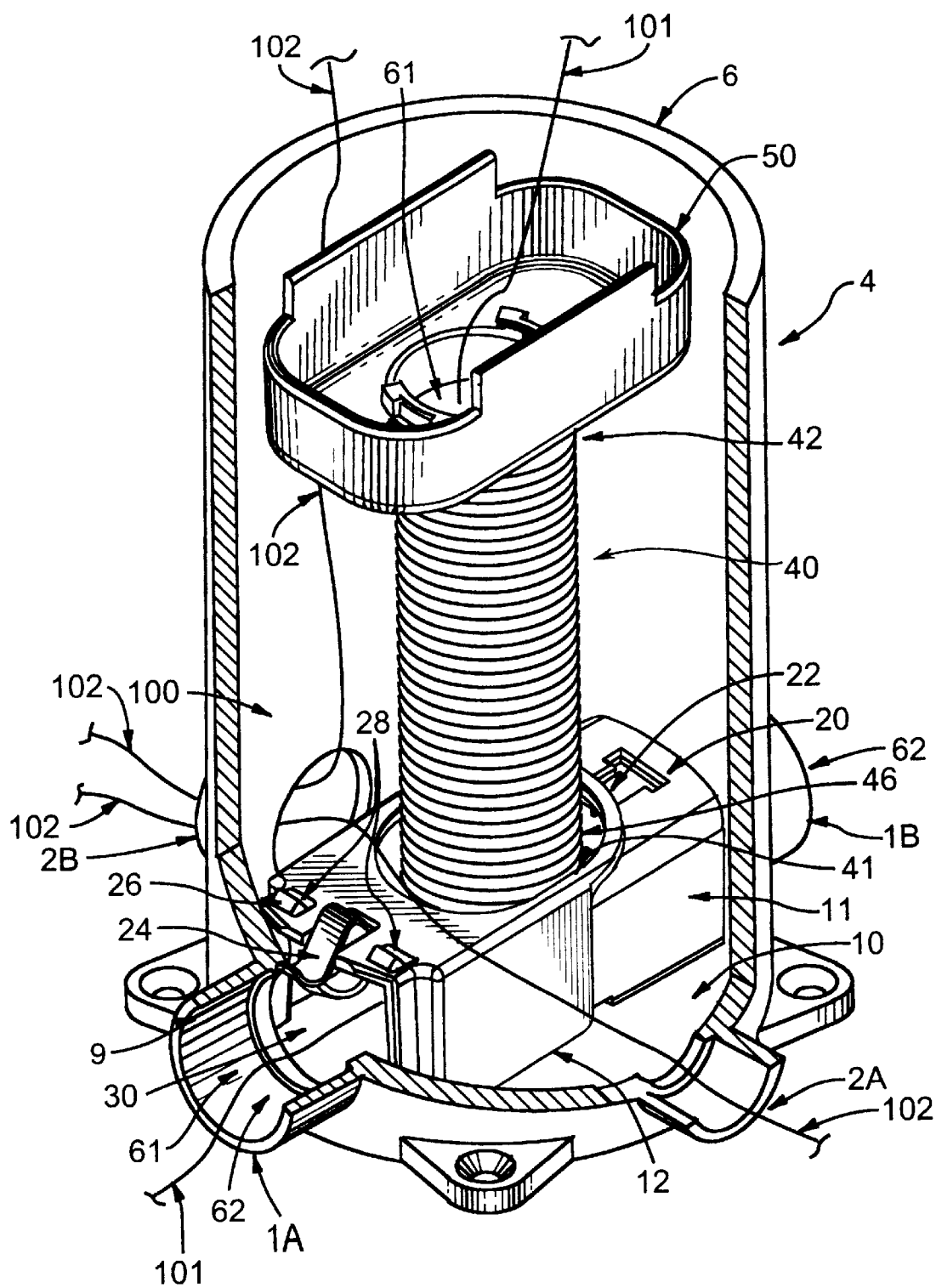
FIG. 3 is a perspective drawing of the electrical divider according to one embodiment of the present invention installed in an electrical box with a portion of the electrical box removed for the purposes of illustration.

The first part 10 further comprises a first opening 16 which extends through the first portion 11 and the second portion 12. The first opening 16 is attachable to a conduit 40. The conduit 40 is preferably corrugated and can be a corrugated pipe 44, as shown in FIG. 3. To attach the opening 16 to a corrugated conduit 40, the first opening 16 comprises an attaching device 18 which interacts with a corrugation 46 of the first end 41 of corrugated pipe 44 and thereby attaches the conduit 40 to the opening 16.

Preferably, the first part 10 comprises at least one locking tab 24, as shown in FIGS. 1B and 1C. The locking tab 24 engages one of the ports in the electrical box. In this way, when the biasing member 14 biases the second portion 12 away from the first portion 11, expanding the first part 10 from the contracted configuration toward the expanded configuration, the locking tab 24 will engage a port, such as port 1A shown in FIG. 3, of the electrical box 4 and thereby secure the first part 10 to the electrical box 4. In addition, locking tab 24 is located proximate an entry 30 which communicates with the first opening 16. When the locking tab 24 engages the port 1A, the entry 30 will be near to and communicate with the port 1A (see FIG. 3). In this way, the locking tab 24 performs the dual function of positioning and orientating the first part 10 to a desired position and orientation where the entry 30 is in communication with the opening of a port, and also, securing the first part 10 in this desired position by engaging the port.

Preferably, the locking tab 24 engages the top portion 9 of a port 1A, 1B, 2A, 2B (see FIG. 3). While the ports 1A, 1B, 2A, 2B are generally located at the bottom of an electrical box 4, the ports 1A, 1B, 2A, 2B may have different diameters such that the top portion 9 of the port which the locking tabs 24 will engage may be located at different longitudinal positions in the electrical box 4. Accordingly, the locking tab 24, in a preferred embodiment, is flexible and long, so that the locking tab 24 can engage the top portion of ports having different diameters. In this way, the first part 10 can be used in electrical boxes having ports of a different diameter, and, ports which may not necessarily be located at the bottom of the electrical box 4.

FIGS. 2A, 2B, 2C and 2D show a second part 50 of the electrical divider. The second part 50 has a second opening 52 which is attachable to a second end 42 of a conduit 40. As stated above, in a preferred embodiment, the conduit 40 is corrugated, and is preferably a corrugated pipe 40, and the second opening 52 is machined to attach to the corrugated pipe 40. Preferably, the second part 50 will have another attaching device 58, similar to attaching device 18 of the first part 10 to interact with a corrugation 46 of the second end 42 of the conduit 40. However, it is understood that the first opening 16 and second opening 52 can be attached to the corrugated pipe by any known means, including a friction fit. In addition, as the second part 50 will generally be located at the second or top end 42 of the conduit 40, the conduit 40 may not be very rigidly attached to the second opening 52. Rather, the second opening 52 may be attached to the conduit 40 by simply placing the second part 50 on the conduit 40 and applying a force against the second part 50 and the conduit 40, such as by means of a floor cover plate fixed to the electrical box 4 in which the divider 100 is installed.

Figure 2A:
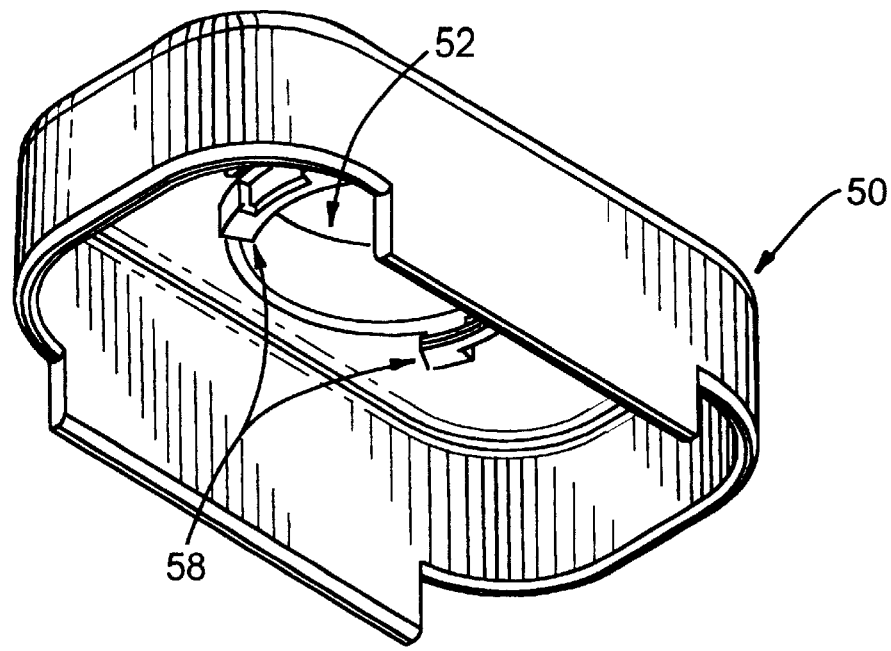
FIG. 2A is a perspective drawing of a second part of the electrical divider according to an embodiment of the present invention.
Figure 2B:
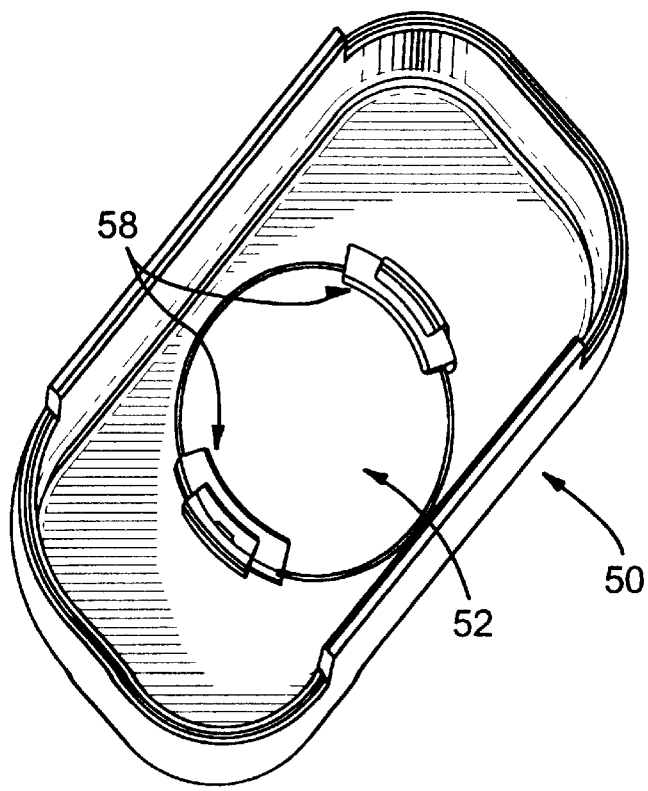
FIG. 2B is a perspective drawing of the second part shown in FIG. 2A, but from a different view.
Figure 2C:
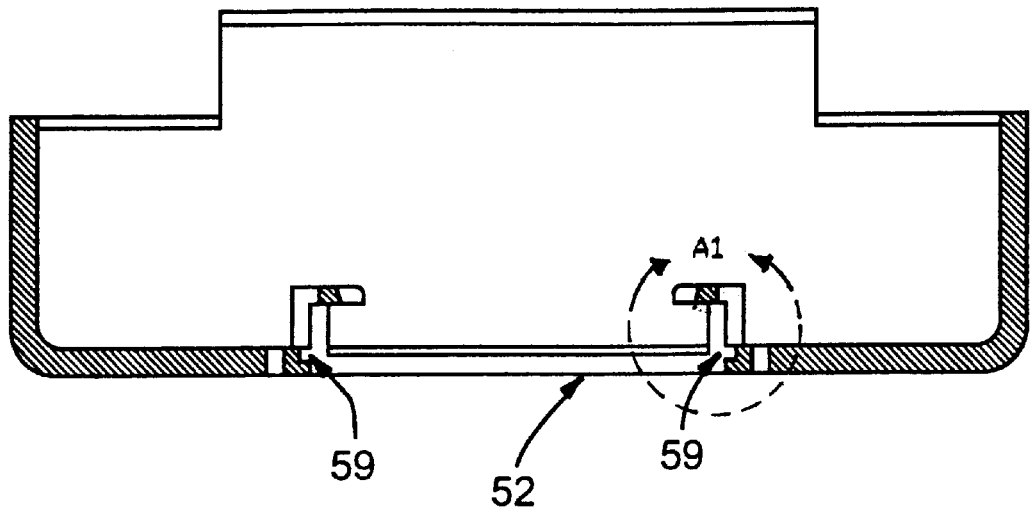
FIG. 2C is a sectional view of the second part shown in FIG. 2A.
Figure 2D:
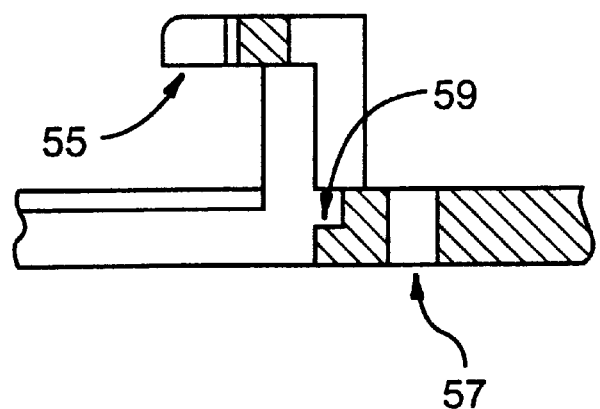
FIG. 2D is a detailed drawing of the sectional view shown in FIG. 2C.

FIGS. 2C and 2D show the attaching device 58 of the second part 50 according to a preferred embodiment in more detail. FIG. 2D is a detailed drawing of the attaching device 58 within circle A1 shown in FIG. 2C. As can be seen from FIGS. 2C and 2D, the attaching device 58 has a leading edge 59 which engages the corrugations of a corrugated conduit 40 to retain the conduit 40 near the second opening 52. The leading edge 59 is displaced radially outward as a corrugation passes through the opening 52. To accommodate this displacement, there is a space or notch 57 formed between the leading edge 59 and the main body of part 50, which notch 57 is decreased as the leading edge 59 is displaced outward. A stop 55 is provided at the second opening 52 to prevent the conduit 40 from passing too far through the opening 52.

FIG. 3 shows the electrical divider, shown generally by reference numeral 100, installed in an electrical box 4. As shown in FIG. 3, the electrical box 4 has a first set of ports 1A, 1B for receiving a first type of wire 101, such as a power wire. The electrical box 4 also has a second set of ports 2A, 2B for receiving a second type of wire 102, such as a communication wire. Generally, as shown in FIG. 3, the electrical box 4 will have ports 1A, 1B, 2A, 2B which receive the same type of wire diametrically opposed from each other, although different arrangements are possible. Also, while the electrical box 4 shown in FIG. 3 has four ports 1A, 1B, 2A, 2B, it is understood that the electrical box 4 could have additional ports (not shown).

FIG. 3 shows the divider 100 comprising the first part 10 and the second part 50. FIG. 3 also shows first part 10 of the divider with the first portion 11 and the second portion 12 connected together and inserted into the electrical box 4. As shown in FIG. 3, the guide tab 22 is inserted in sliding relation to the channel 20 to guide the movement of the first portion 11 with respect to the second portion 12. Also, the extensions 26 are engaging the locking holes 28 so that the first portion 11 is connected to the second portion 12 at one end. The biasing member 14 biases the first portion 11 away from the second portion 12. In this embodiment, the biasing member 14 acts on the extensions 26, which engage the locking holes 28, to bias the first part 10 to the second or expanded configuration. Movement of the guide tab 22 within the channel 20 and the sliding tab 23 within the groove 21 will guide the movement of the first portion 11 with respect to the second portion 12 and prevent rotation of the first portion 11 with respect to the second portion 12.

FIG. 3 also illustrates the conduit 40 with the first end attached to the opening 16 of the first part 10 and the second end 42 attached to the opening 52 of the second part 50. In this way, a passage 61 is defined from the desired port 1A through the entry 30 through the opening 16 in the first part 10 and into the first end 41 of the conduit 40, then through the second end 42 of the conduit 40 into the opening 52 of the second part 50 and finally to the open end 6 of the electrical box 4. Accordingly, in this embodiment, the opening 16 of the first part 10 indirectly communicates with the opening 52 of the second part 50. An electrical receptacle and a floor cover plate (not shown) would then be inserted on the open end 6 and attached to the first and second types of wires 101, 102.

FIG. 3 also shows the locking tab 24 engaging the top portion 9 of the desired port 1A. When the first part 10 is inserted into the electrical box 4, the first part 10 can be moved and rotated until the locking tab 24 engages the desired port, which in FIG. 3 is port 1A. It is understood that the orientation of the first part 10 will depend on the types of wires entering the respective ports 1A, 1B, 2A, 2B. In the embodiment shown in FIG. 3, the type of wire which is to pass within the passage 61 of the electrical divider 100 emanates from the first set of ports 1A, 1B. Accordingly, the user will insert the first part 10 into the electrical box 4 with a general understanding of the location of the first set of ports 1A, 1B and allow the locking tab 24 to position the first part 10 in the desired position and orientation. In this case, the desired position and orientation will be with the entry 30 near and in communication with the desired port 1A.

Accordingly, as shown in FIG. 3, when the first part 10 is in the desired position and the conduit 40 is attached to the first opening 16 and the second opening 52, the first part 10, the conduit 40 and the second part 50 form a passage 61 for the first type of wire 101 to extend from the first or desired port 1A to the open end 6 of the electrical box 4. It is apparent that the passage 61 is separated from the second set of ports 2A, 2B. In this way, the first type of wire 101, such as power wires, can pass through the first set of ports 1A, 1B and through the passage 61 while the second type of wire 102, such as communication wires, can pass through the second set of ports 2A, 2B external of the passage 61. In this way, the first type of wire 101 and the second type of wire 102 can be separated from each other.

As also seen in FIG. 3, the first part 10 defines a second passage 62 from port 1A to port 1B. In this way, the second passage 62 permits the first type of wire 101 to pass between the first set of ports 1A, 1B. Likewise, the second type of wire 102 can pass between the second set of ports 2A, 2B externally of both the second passage 62 and the first passage 61. Thus, the divider 100 can separate the first type of wire 101, such as power wires, from the second type of wire 102, such as communication wires, which are passing into the electrical box 4 whether or not the wires are to extend out through the open end 6 of the electrical box 4 or to continue through the electrical box 4 out of another port 1A, 1B or 2A, 2B.

Should the divider 100 need to be removed for any reason, the second part 50 could be removed from the second end 42 of the conduit 40. Then, the first end 41 of the conduit 40 could be removed from the first part 10. Finally, the first portion 11 could be moved towards the second portion 12 against the biasing force of the biasing member 14 and towards the contracted configuration. Once the first part 10 is in the contracted configuration, the locking tab 24 will no longer engage the port 1A, and the first part 10 could be removed.

Figure 4:
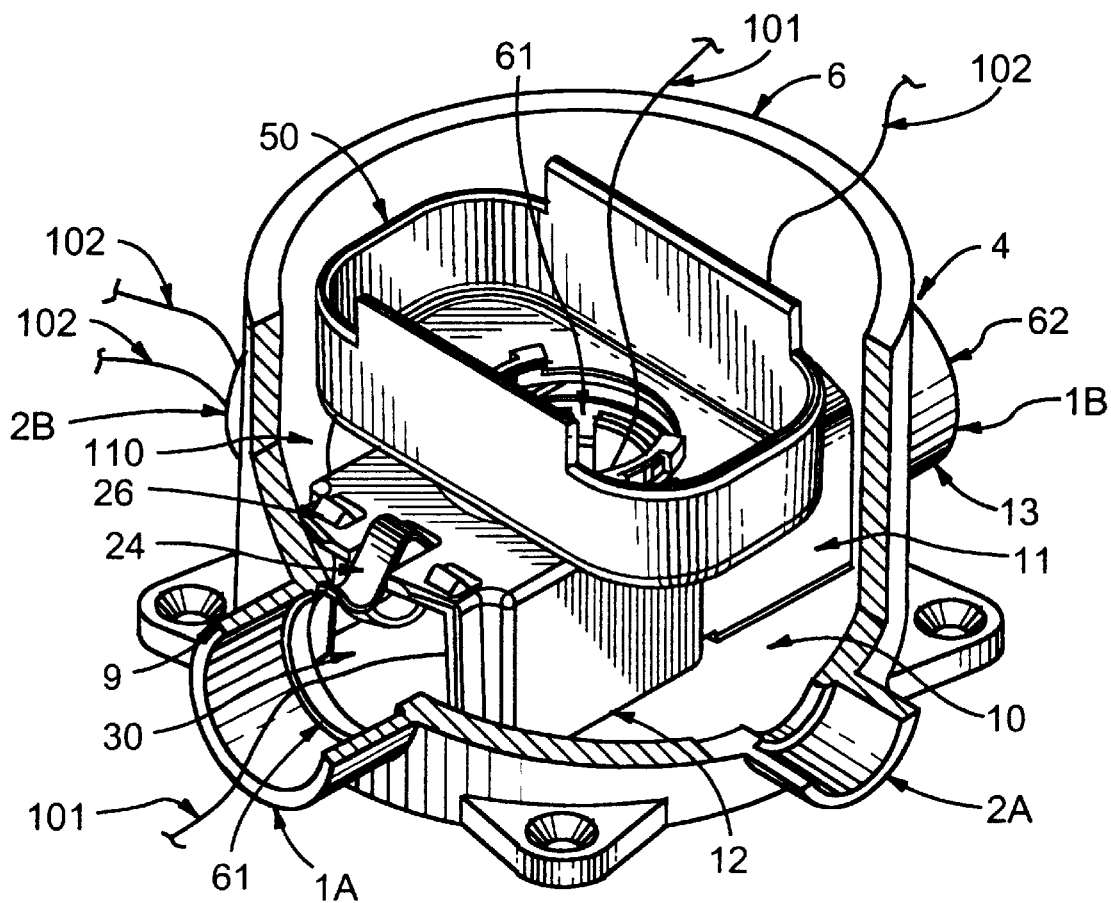
FIG. 4 is a perspective drawing of the electrical divider without a conduit and installed in an electrical box with a portion of the electrical box removed for the purposes of illustration.

FIG. 4 shows a further embodiment of the present invention where no conduit 40 is used between the first part 10 and the second part 50. As shown in FIG. 4, the second part 50 is in contact with the first part 10, and, the second opening 52 is in direct communication with the first opening 16. Preferably, a notch (not shown), either on the first part 10, the second part 50, or both, is used to guide the first opening 16 into direct communication with the second opening 52. The divider, shown generally by reference numeral 110 in FIG. 4, could be used in electrical boxes 4 which have a smaller longitudinal dimension such that the first part 10 and the second part 50, without a conduit, can create a passage 61 for the first type of wire 101 from the first set of ports 1A, 1B to the opening 6.

It is understood that, while the present invention has been described and illustrated in terms of a round electrical box, the present invention is not limited to round electrical boxes. Rather, the present invention can operate with electrical boxes having different shapes, including square and oval. The present invention can also operate with electrical boxes having different number of ports, such as 4, 6, 8 or more.

It also understood that while the channel 20 has been illustrated to be on the first portion 11 and the guide tab 22 has been illustrated to be on the second portion 12, this arrangement can be interplaced. In particular, the second portion 12 could comprise the channel 20 and the first portion 11 could comprise the guide tab 22. This specific arrangement is not relevant provided the guide tab 22 cooperates with the channel 20 to guide the movement of the first portion 11 with respect to the second portion 12. Likewise, the extensions 26 and the locking holes 28 could be interplaced. In particular, the second portion 12 could comprise the extensions 26, rather than the first portion 11, and the first portion 11 could comprise the locking holes 28, rather than the second portion 12. In either case, the extensions 26 would engage the locking holes 28 to connect the first portion 11 to the second portion 12 at one end while permitting the first portion 11 to move relative to the second portion 12. In a similar manner, provided the sliding tab 23 cooperates with the groove 21, the groove 21 could be located on the inside surface of the second portion 12 and the sliding tab 23 could be located on the outside surface of the first portion 11.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. An electrical divider for installation in an electrical box, said electrical box having an open end, a first port adapted to receive a first type of wire and a second port adapted to receive a second type of wire, said electrical divider comprising:
   a first part comprising a first portion and a second portion, said first portion being movable with respect to the second portion, and a first opening;
   a second part having a second opening;
   wherein the first portion moves relative to the second portion to secure the first part to the electrical box; and
   wherein the first opening communicates with the second opening to define a passage for the first type of wire from the first port to the open end, said passage being separated from the second port.

2. The divider as claimed in claim 1 further comprising a biasing member to bias the first portion away from the second portion.

3. The divider as claimed in claim 2 wherein the first part comprises a locking tab, said locking tab engaging the first port when the first portion is biased away from the second portion to secure the first part to the electrical box.

4. The divider as claimed in claim 3 wherein the first opening is attachable to a first end of a conduit and the second opening is attachable to a second end of the conduit; and
   wherein when the first end of the conduit is attached to the first opening and the second end of the conduit is attached to the second opening, the passage for the first type of wire from the first port to the open end is defined by the first part, the conduit and the second part.

5. The divider as claimed in claim 4 wherein the first part comprises an entry to the passage; and
   wherein the entry communicates with the first port when the first part is secured to the electrical box.

6. The divider as claimed in claim 5 wherein the first type of wire is a power wire.

7. The divider as claimed in claim 6 wherein the second type of wire is a communication wire and wherein the second type of wire extends from the second port to the open end externally of the passage.

8. The divider as claimed in claim 7 wherein the conduit is a corrugated pipe.

9. An electrical divider for installation in an electrical box, said electrical box having an open end, a first port adapted to receive a first type of wire and a second port adapted to receive a second type of wire, said electrical divider comprising:
   a first part comprising a first opening attachable to a first end of a conduit and being expandable from a contracted configuration to an expanded configuration;
   a second part having a second opening attachable to a second end of the conduit;
   wherein the first part is inserted into the open end of the electrical box to a desired position, and, the first part is expanded from the contracted configuration toward the expanded configuration to secure the first part in the desired position; and
   wherein when the first part is in the desired position, and the conduit is connected to the first opening and the second opening, the first part, the conduit and the second part define a first passage for the first type of wire from the first port to the open end, said passage being separated from the second port.

10. The divider as claimed in claim 9 further comprising at least one tab, said tab engaging the first port when the first part is in the desired position and expanded towards the expanded configuration to facilitate positioning of the first port in the desired position.

11. The divider as claimed in claim 10 further comprising a biasing member to bias the first part toward the expanded configuration.

12. The divider as claimed in claim 9 wherein the first part comprises a first portion and a second portion, said first portion being movable with respect to the second portion to expand the first part from the contracted configuration to the expanded configuration.

13. The divider as claimed in claim 12 further comprising a biasing member to bias the first portion away from the second portion.

14. The divider as claimed in claim 13 wherein the first part comprises an entry to the passage; and
   wherein the entry communicates with the first port when the first part is in the desired position.

15. The divider as claimed in claim 14 wherein the first type of wire is a power wire.

16. The divider as claimed in claim 15 wherein the second type of wire extends from the second port to the open end externally of the first passage and the second passage; and
   wherein the second type of wire is a communication wire.

17. The divider as claimed in claim 16 wherein the conduit is a corrugated pipe.

18. The divider as claimed in claim 13 wherein the first part comprises a guide tab travelling within a channel to guide movement of the first portion with respect to the second portion.

19. The divider as claimed in claim 18 wherein the first part comprises extensions which engage locking holes to connect the first portion to the second portion while permitting the first portion to move with respect to the second portion.

20. The divider as claimed in claim 19 wherein the first part comprises a sliding tab travelling within a groove to prevent rotation of the first portion with respect to the second portion.

21. An electrical divider for installation in an electrical box, said electrical box having an open end, a first set of ports comprising at least two first ports adapted to receive a first type of wire, and a second set of ports comprising at least two second ports adapted to receive a second type of wire, said electrical divider comprising:

a first part comprising a first opening attachable to a first end of a conduit and being expandable from a contracted configuration to an expanded configuration;

a second part having a second opening attachable to a second end of the conduit;

wherein the first part is inserted into the open end of the electrical box to a desired position and the first part is expanded from the contracted configuration toward the expanded configuration to secure the first part in the desired position; and wherein when the first part is in the desired position, and the conduit is connected to the first opening and the second opening, the first part, the conduit and the second part define a first passage for the first type of wire from one of the first ports to the open end, said first passage being separated from the second port;

wherein when the first part is secured in the desired position, the first part defines a second passage between said at least two first ports of the first set of ports for passage of the first type of wire.

22. The divider as claimed in claim 21
   wherein when the first part is secured in the desired position, the second type of wire can pass between said at least two second ports of the second set of ports externally of the first passage and the second passage.

* * * * *